Dec. 12, 1950  
E. CAVALIERI  
2,533,875  
INTERMEDIATE-PULVERIZING AND MIXING  
MACHINE FOR CHOCOLATE MASSES  
Filed March 6, 1947
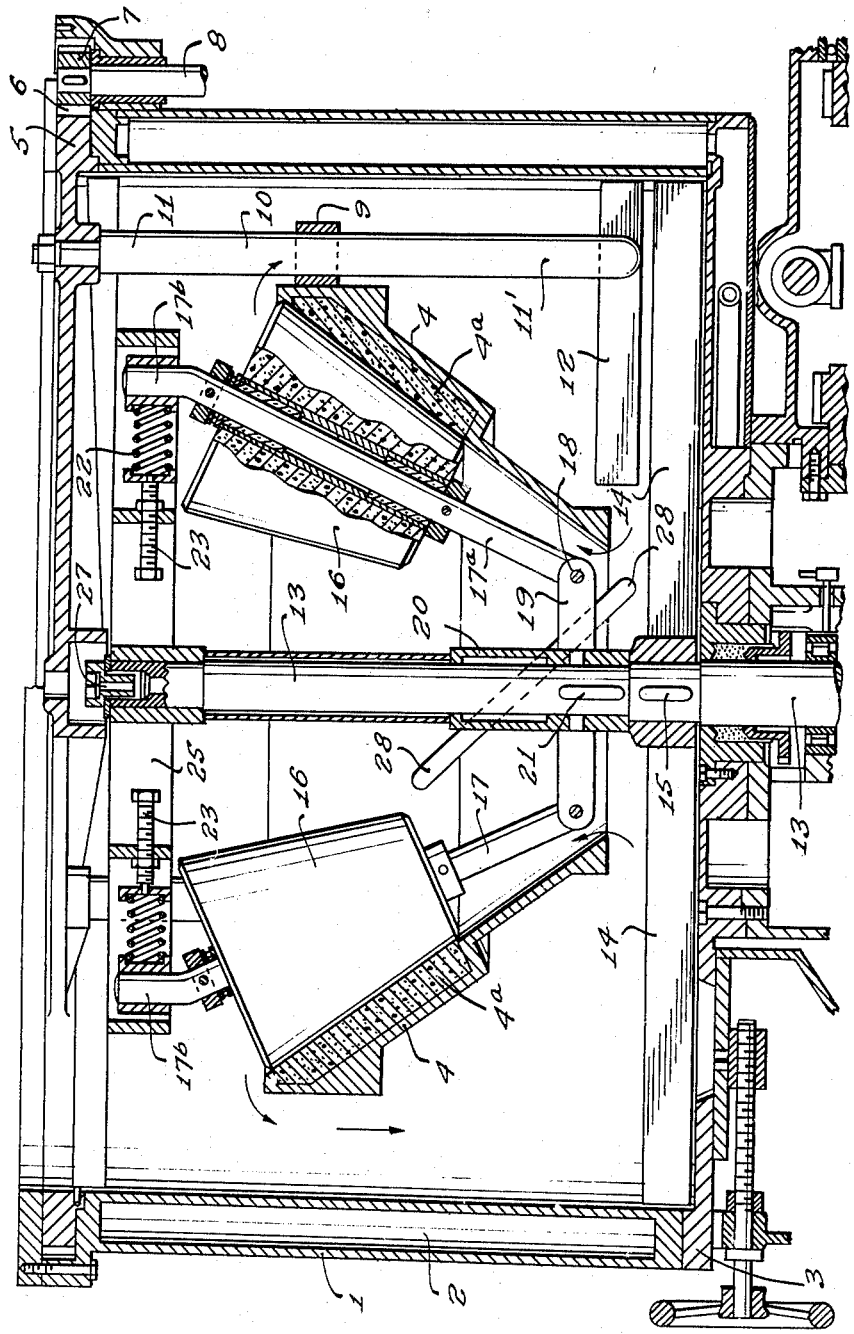
INVENTOR.  
Emilio Cavalieri  
BY Patented Dec. 12, 1950

2,533,875

UNITED STATES PATENT OFFICE 2,533,875

INTERMEDIATE-PULVERIZING AND MIXING MACHINE FOR CHOCOLATE MASSES

Emilio Cavalieri, Milan, Italy, assignor to S. A. Macchine per l'Industria Dolciaria Carle & Montanari, Milan, Italy Application March 6, 1947, Serial No. 732,894
In Italy September 27, 1945

Section 1, Public Law 690, August 8, 1946
Patent expires September 27, 1965

9 Claims. (Cl. 241—66)

1

The present invention relates to a pulverizing and mixing machine for the manufacture of chocolate and the like.

It is an object of the present invention to provide a machine which allows the chocolate mass to be subjected to a final pulverization following crushing in an earlier operation.

It is another object of the present invention to provide a machine by which the final traces of moisture can be removed from the chocolate mass.

It is a still further object of the present invention to provide a machine allowing a complete mixing of the chocolate mass with a flavoring material.

A pulverizing and mixing machine for the manufacture of chocolate and the like according to the present invention comprises in combination, a stationary outer tank, a revolvable inner tank having side walls, an open bottom and an open top, means for stirring the mass contained in the outer tank and passing it into the inner tank through the open bottom, roller means arranged in the inner tank and being movable outwards and against the side walls so as to exert a pulverizing action when revolved about a common axis, and means for revolving the stirring means, the roller means and the inner tank.

In a preferred embodiment the inner tank has an inverted frusto-conical shape.

Preferably a machine according to the present invention comprises a first drive shaft operatively connected to the inner tank for rotation of the same and a second drive shaft provided with support means for the rollers which are pivoted to the support means so as to be movable outwards and against the side walls of the inner tank.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

The only figure is a sectional elevation through a machine according to the present invention.

Referring now to the drawings, the machine according to the invention comprises a stationary double-walled outer tank 1 of substantially cylindrical shape. The space 2 between the walls of the tank 1 serves for the circulation of a heating fluid such as hot water. The outer tank 1 is provided with a bottom 3. These parts constitute together the stationary part of the machine.

2

An inner tank 4 is revolvably arranged in the outer tank 1 and has preferably the shape of an inverted frusto-cone having an open bottom and an open top and side walls spaced apart from the walls of the outer tank 1.

The inner tank 4 derives its slow rotation from a first drive shaft 8 arranged in a vertical position outside the outer tank 1 and provided with a pinion 7, the teeth of which mesh at 6 with the circumferential teeth of a ring member 5. Vertical rods such as 10 are rigidly connected with their upper parts 11 to the ring member 5 and carry annular connecting pieces 9 which are rigidly secured to the outer wall of the inverted frusto-conical inner tank 4. The lower ends 11' of the rods 10 are connected to stirring and loosening members such as 12.

Centrally in the outer tank 1 a second drive shaft 13 is arranged which penetrates the bottom 3 of the outer tank 1 and extends substantially through the entire height thereof. Immediately above the bottom 3 of the outer tank 1 are provided stirring and loosening members 14 which are keyed at 15 to the shaft 13. Furthermore the shaft 13 carries lower support arms 19 which are fixed on a sleeve 20 surrounding the shaft 13 and keyed at 21 to the shaft 13. The upper end of the shaft 13 carries a sleeve 26 connected to a wheel 25 having a vertically projecting part 24 provided with apertures through which the adjusting screws 23 for pressure springs 22 extend which are to be described in more detail hereinafter. A screw 27 connects the sleeve 26 to the shaft 13.

To the lower support arms 19 are hinged at 18 the lower ends 17a of inclined spindles 17, the upper ends 17b of which are held in bearings being under the influence of the horizontally displaceable springs 22. Intermediate the ends 17a and 17b of the spindles 17 rollers 16 are arranged which cooperate with the portion 4a of the inner wall of the inner tank 4. The roller 16 and the cooperating portion 4a of the inner wall consists preferably of granite.

Stirrers 28 are rigidly connected to the sleeve 20 on which the lower supporting arm 19 is arranged. The stirrers 28 are in an inclined position and serve for transporting the mass of chocolate from the bottom opening of the inner tank 4 towards the interior and the wall portion 4a thereof.

The operation of this device is as follows:

Shafts 8 and 13 are driven in any manner known per se in the art. The rotation of shaft 8 causes the ring member 5 to rotate slowly about its axis so that the rods 10 revolve slowly in the outer tank 1 which rotation is transferred to the inner tank 4 by the members 9. At the same time the stirrers 12 are slowly rotated in the outer tank 1.

The rotation of the shaft 13 effects rotation of the stirrers 14 and of the spindles 17 which are hinged at 18 to the lower supporting arms 19 whereas their upper ends 17b are pressed by the springs 22 rotating with the wheel 25 at the same angular velocity as the supporting arms 19 so that the spindles 17 revolve together with the rollers 16 which are kept in contact with the inner wall 4a of the inner tank 4 and are thereby rotated about their axes. It will be understood that the stirrers 12 and 14 rotate at different speeds and therefore crush the chocolate mass introduced into the bottom of the outer tank 1 in an effective manner.

The crushed chocolate mass is led by the stirrers 28 which have an inclined position into the inner tank 4 through the open bottom thereof and here the mass is caught by the rollers 16 and thoroughly pulverized and mixed between the rollers 16 and the wall portion 4a of the inner tank 4. The pressure of the rollers 16 against the wall portion 4a can be adjusted by means of the adjusting screws 23, acting upon the springs 22 pressing the upper end 17b of the spindle 17 outwards.

It will be understood that each of the elements described above, or two or more together, may also find a useful application in other types of pulverizing and mixing machines differing from the types described above.

While I have illustrated and described the invention as embodied in pulverizing and mixing machines, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A pulverizing and mixing machine for the manufacture of chocolate and the like, comprising in combination a stationary outer tank; a revolvable inner tank having side walls, an open bottom and an open top; means for stirring the mass contained in said outer tank and passing it into said inner tank through said open bottom; roller means arranged in said inner tank and being movable outwards and against said side walls so as to exert a pulverizing action when revolved about a common axis; and means for revolving said stirring means, said roller means and said inner tank.

2. A pulverizing and mixing machine for the manufacture of chocolate and the like, comprising in combination a stationary outer tank; a revolvable inner tank of inverted frusto-conical shape, the said inner tank having side walls, an open bottom and an open top; means for stirring the mass contained in said outer tank and passing it into said inner tank through said open bottom; roller means arranged in said inner tank and being movable outwards and against said side walls so as to exert a pulverizing action when revolved about a common axis; and means for revolving said stirring means, said roller means and said inner tank.

3. A pulverizing and mixing machine for the manufacture of chocolate and the like, comprising in combination a stationary outer tank of substantially cylindrical shape; a revolvable inner tank of inverted frusto-conical shape, the said tank having an open bottom and an open top and side walls spaced from the walls of said outer tank; means for stirring the mass contained in said outer tank and passing it into said inner tank through said open bottom; roller means arranged in said inner tank and being movable outwards and against said side walls so as to exert a pulverizing action when revolved about a common axis; and means for revolving said stirring means, said roller means and said inner tank.

4. A pulverizing and mixing machine for the manufacture of chocolate and the like, comprising in combination a stationary outer tank of substantially cylindrical shape; a revolvable inner tank of inverted frusto-conical shape, the said tank having an open bottom and an open top and side walls spaced from the walls of said outer tank; means for stirring the mass contained in said outer tank and passing it into said inner tank through said open bottom; roller means arranged in said inner tank and being movable outwards and against said side walls so as to exert a pulverizing action when revolved about a common axis; means for revolving said stirring means and said inner tank; and further means for revolving said roller means about a common axis.

5. A pulverizing and mixing machine for the manufacture of chocolate and the like, comprising in combination a stationary outer tank; a revolvable inner tank having side walls, an open bottom and an open top; a first drive shaft; means operatively connecting said inner tank with said drive shaft for rotation thereby; a second drive shaft; support means rigidly connected to said second drive shaft; roller means arranged in said inner tank and pivoted to said support means so as to be movable outwards and against said side walls of the inner tank; means for stirring and loosening the mass contained in said outer tank and passing it into said inner tank through said open bottom, the latter means being operatively connected to said second drive shaft.

6. A pulverizing and mixing machine for the manufacture of chocolate and the like, comprising in combination a stationary outer tank; a revolvable inner tank having side walls, an open bottom and an open top; a first drive shaft; means operatively connecting said inner tank with said drive shaft for rotation thereby; a second drive shaft; support means rigidly connected to said second drive shaft; roller means arranged in said inner tank and pivoted to said support means so as to be movable outwards and against said side walls of the inner tank; means for stirring and loosening the mass contained in said outer tank and passing it into said inner tank through said open bottom, the latter means being operatively connected to said second drive shaft; further stirring means operatively connected to said first drive shaft and disposed in said outer tank generally below the bottom plane of said inner tank; and a jacket provided circumferentially on said outer tank for receiving heating means.

7. A pulverizing and mixing machine for the manufacture of chocolate and the like, comprising in combination a stationary outer tank of substantially cylindrical shape; a revolvable inner tank of inverted frusto-conical shape, the said tank having an open bottom and an open top and side walls spaced from the walls of said outer tank; a first drive shaft; means operatively connecting said inner tank with said drive shaft for rotation thereby; a second drive shaft; support means rigidly connected to said second drive shaft; roller means arranged in said tank and pivoted to said support means so as to be movable outwards and against said side walls of the inner tank; and means for stirring and loosening the mass contained in said outer tank and passing it into said inner tank through said open bottom, the latter means being operatively connected to said second drive shaft.

8. A pulverizing and mixing machine for the manufacture of chocolate and the like, comprising in combination a stationary outer tank; a revolvable inner tank having side walls, an open bottom and an open top; a first drive shaft; means operatively connecting said inner tank with said drive shaft for rotation thereby; a second drive shaft; upper and lower support arms extending in substantially horizontal direction from said second drive shaft; horizontally displaceable spring means carried by said upper arms; inclined spindles swingably secured with their bottom ends to said lower arms and with their top ends to said spring means; roller means carried by said spindles intermediate the said ends of the same so as to be movable outwards and against said side walls of the inner tank; and means for stirring and loosening the mass contained in said outer tank and passing it into said inner tank through said open bottom, the latter means being operatively connected to said second drive shaft.

9. A pulverizing and mixing machine for the manufacture of chocolate and the like, comprising in combination a stationary outer tank of substantially cylindrical shape; a revolvable inner tank of inverted frusto-conical shape, the said tank having an open bottom and an open top and side walls spaced from the walls of said outer tank; a first drive shaft; means operatively connecting said inner tank with said drive shaft for rotation thereby; a second drive shaft; upper and lower support arms extending in substantially horizontal direction from said second drive shaft; horizontally displaceable spring means carried by said upper arms; inclined spindles swingably secured with their bottom ends to said lower arms and with their top ends to said spring means; roller means carried by said spindles intermediate the said ends of the same so as to be movable outwards and against said side walls of the inner tank; and means for stirring and loosening the mass contained in said outer tank and passing it into said inner tank through said open bottom, the latter means being operatively connected to said second drive shaft.

CAVALIERI, EMILIO.

REFERENCES CITED

The following references are of record in the file of this patent:

UNITED STATES PATENTS

| Number | Name | Date |
| --- | --- | --- |
| 499,083 | Arnaud | June 6, 1893 |
| 521,663 | Moore | June 19, 1894 |
| 558,803 | Gregory | Apr. 21, 1896 |
| 652,329 | Raymond | June 26, 1900 |
| 1,154,532 | Moss | Sept. 21, 1915 |
| 2,413,793 | Sharp | Jan. 7, 1947 |